Figures 1, 2:
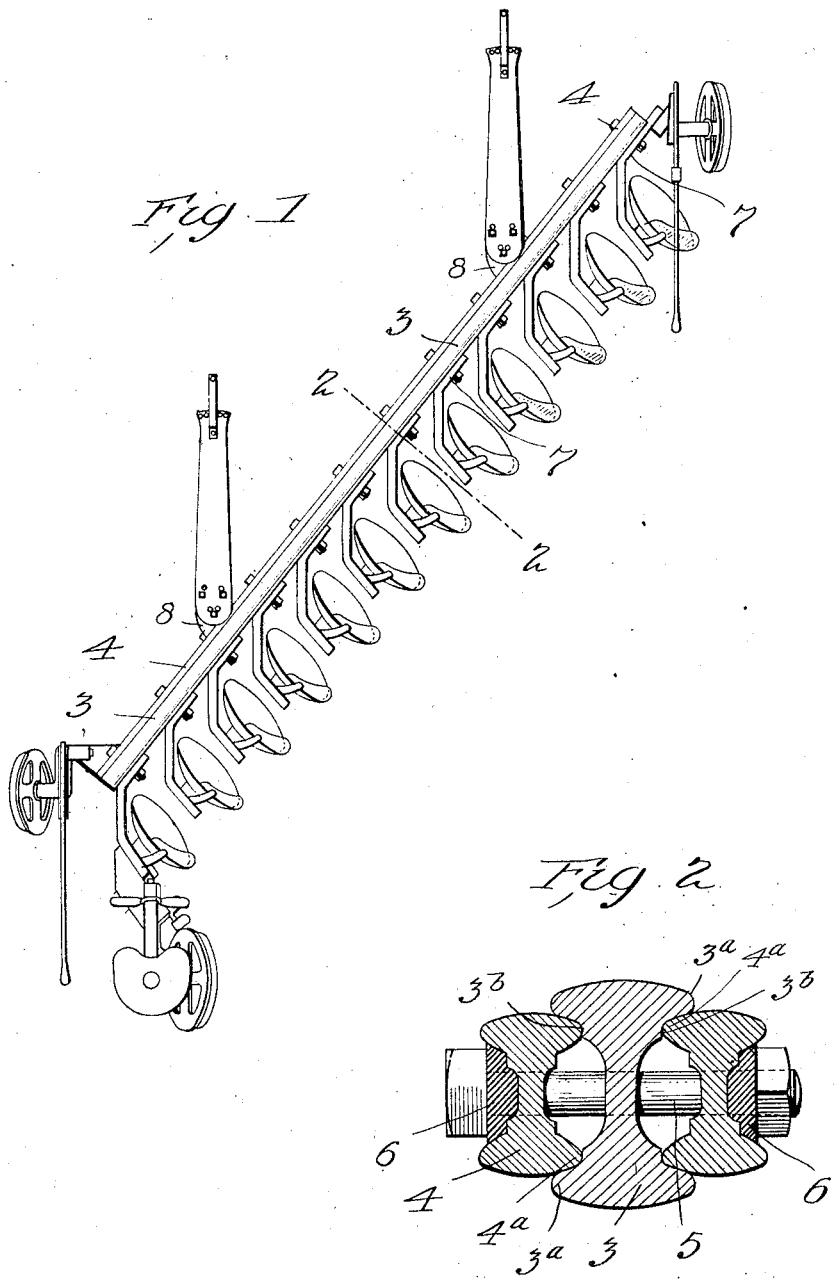

No. 831,190. PATENTED SEPT. 18, 1906.
N. SANDERS.
DISK PLOW.
APPLICATION FILED DEC. 4, 1905.

Attest:
C. S. Middleton
Edward N. Larton

Inventor.
Newell Sanders.
By Shear Middleton Donaldson
Attys.

UNITED STATES PATENT OFFICE.

NEWELL SANDERS, OF CHATTANOOGA, TENNESSEE.

DISK PLOW.

No. 831,190.  Specification of Letters Patent.  Patented Sept. 18, 1906.

Application filed December 4, 1905. Serial No. 390,270.

*To all whom it may concern:*

Be it known that I, NEWELL SANDERS, a citizen of the United States, residing at Chattanooga, Tennessee, have invented certain new and useful Improvements in Disk Plows, of which the following is a specification.

My present invention relates to disk plows; and the objects of the invention are to produce a plow in which a large number of disks may be used where the plow is drawn by a traction-engine, while at the same time it will be perfectly rigid and free from all liability of bending and twisting causing the disks to have different inclinations.

The invention is illustrated in the accompanying drawings, in which—

Figure 1 is a plan view; Fig. 2, a section on line 2 2 of Fig. 1.

In the drawings the numeral 3 designates a bar or main frame member, preferably of the shape shown, which extends diagonally the full length of the plow. This main frame member is preferably of the shape shown, having overhanging rounded edges or flanges $3^a$ and shoulders $3^b$. On the front side of the main frame member 3 and preferably coextensive therewith as to length is located a reinforcing frame member 4, preferably of similar shape in cross-section and having its flanges $4^a$ adapted to rest against the shoulders $3^b$ of the main frame member 3.

The furrow openers or disks are carried by the furrow-opener-supporting beams or members 7, which are bolted to the rear side of the diagonal main frame member above described, while the draft device or devices are secured to the front side, as shown at 8. Bolts 5 pass through the openings in the webs of the two frame members and the beam members 7 and clamp them all firmly together, washers 6 being preferably located between the heads of the bolts and the auxiliary beam on one side and between the members 7 and the nuts on the other side.

The furrow-opener-supporting devices are of course adjustable along the diagonal beam, as also is the draft device or devices. Furrow and land wheels and a trailer-wheel are provided; but as these form no part of the present invention further description thereof is deemed unnecessary.

From the foregoing description it will be seen that I provide a frame which is exceedingly strong and rigid and is not liable to be bent or twisted. The result is that I can provide a plow having as high as twelve disks or more and designed to be drawn by a traction-engine of as much as twenty-five horse-power or more without any danger of the parts being bent or twisted, thereby imparting different inclinations to the disks, causing them to run hard, and resulting in defective work and frequent breakage, as is the case with all previous built-up frames of which I am aware.

Having thus described my invention, what I claim is—

1. In a disk plow a frame comprising a single diagonal bar or main frame member and having overhanging flanges and shoulders, and a reinforcing bar or member located at one side thereof and having flanges bearing against the shoulders of the main bar, and means for securing such bars together, substantially as described.

2. In a disk plow, a frame comprising a single diagonal bar or main frame member extending the entire length of the plow and having overhanging flanges and shoulders, a reinforcing bar or member on the front side thereof, having flanges bearing against said shoulders, furrow-opener-carrying beams having flanges bearing against the shoulders on the rear side and bolts passing through said parts to hold them together, substantially as described.

I testimony whereof I affix my signature in presence of two witnesses.

NEWELL SANDERS.

Witnesses:
J. A. BRAMBUTT,
A. W. LAUTER, Jr.